Figure 3:
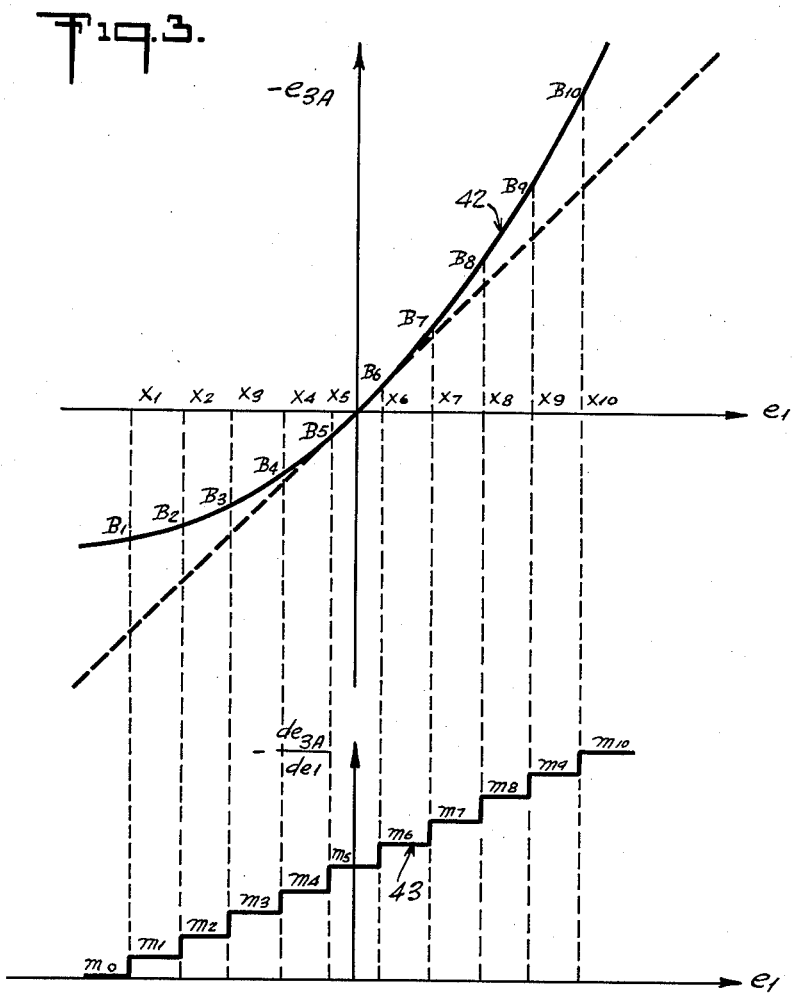

April 24, 1962  R. D. McCOY ET AL  3,031,143
ELECTRONIC COMPUTING METHOD AND APPARATUS
Filed Jan. 7, 1955  4 Sheets-Sheet 1
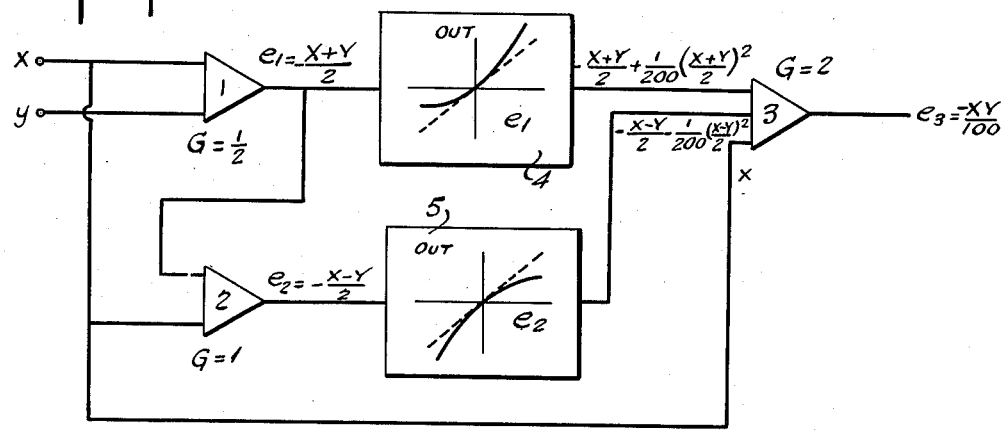
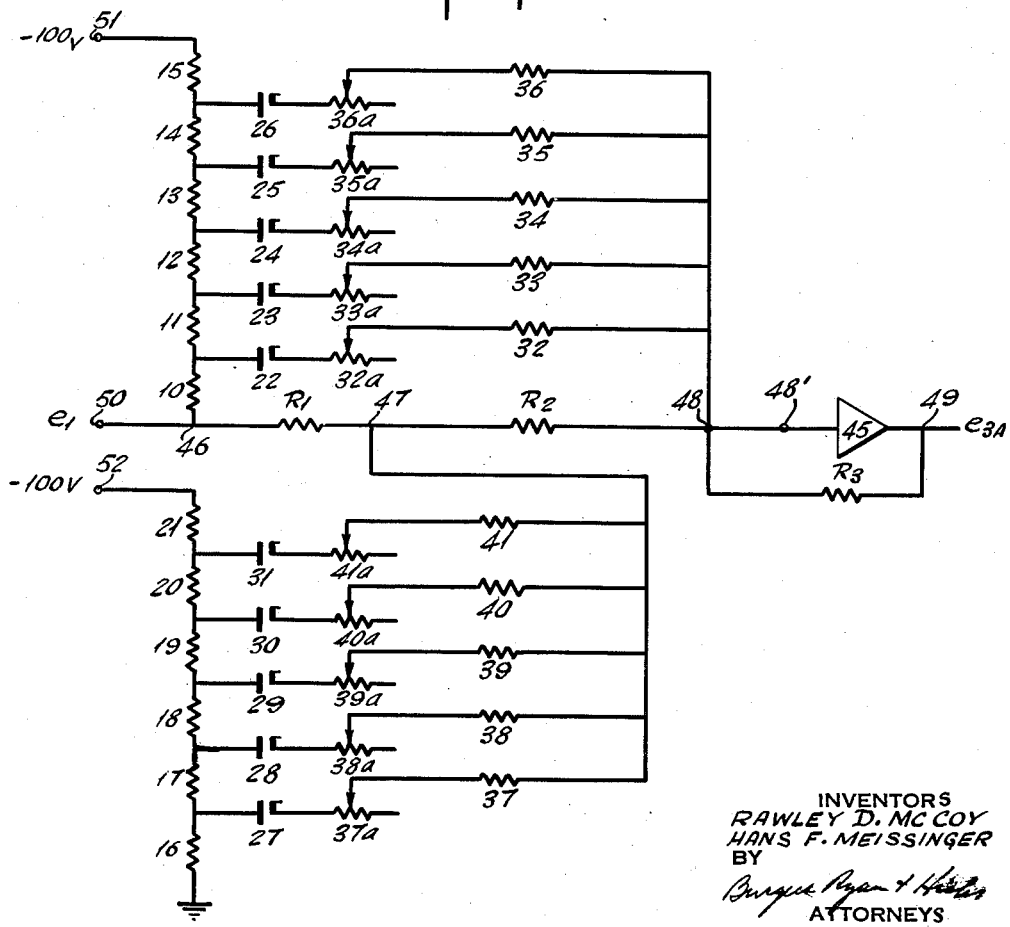
INVENTORS
RAWLEY D. McCOY
HANS F. MEISSINGER
BY
ATTORNEYS

INVENTORS
RAWLEY D. MCCOY
HANS F. MEISSINGER
BY
ATTORNEYS

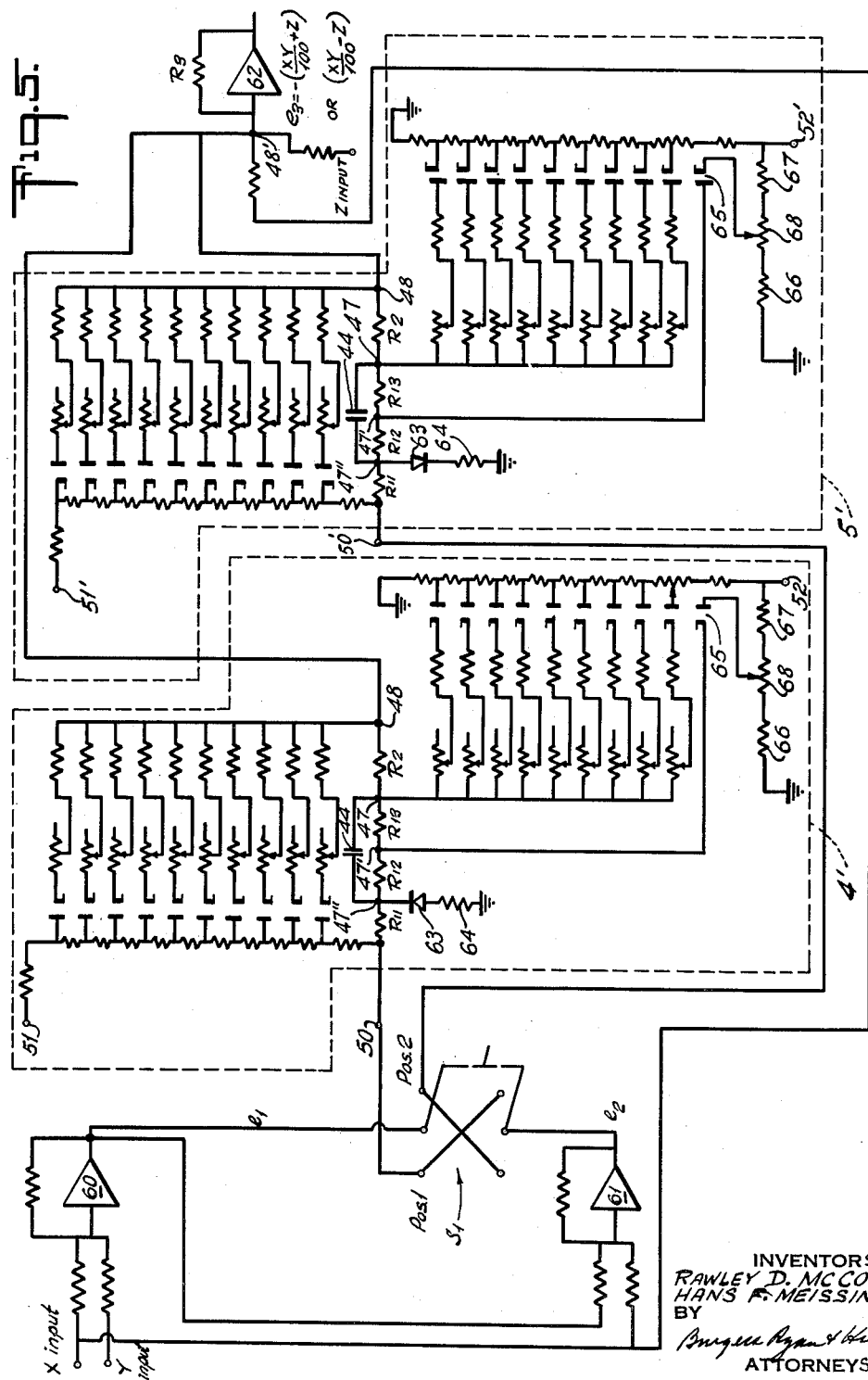

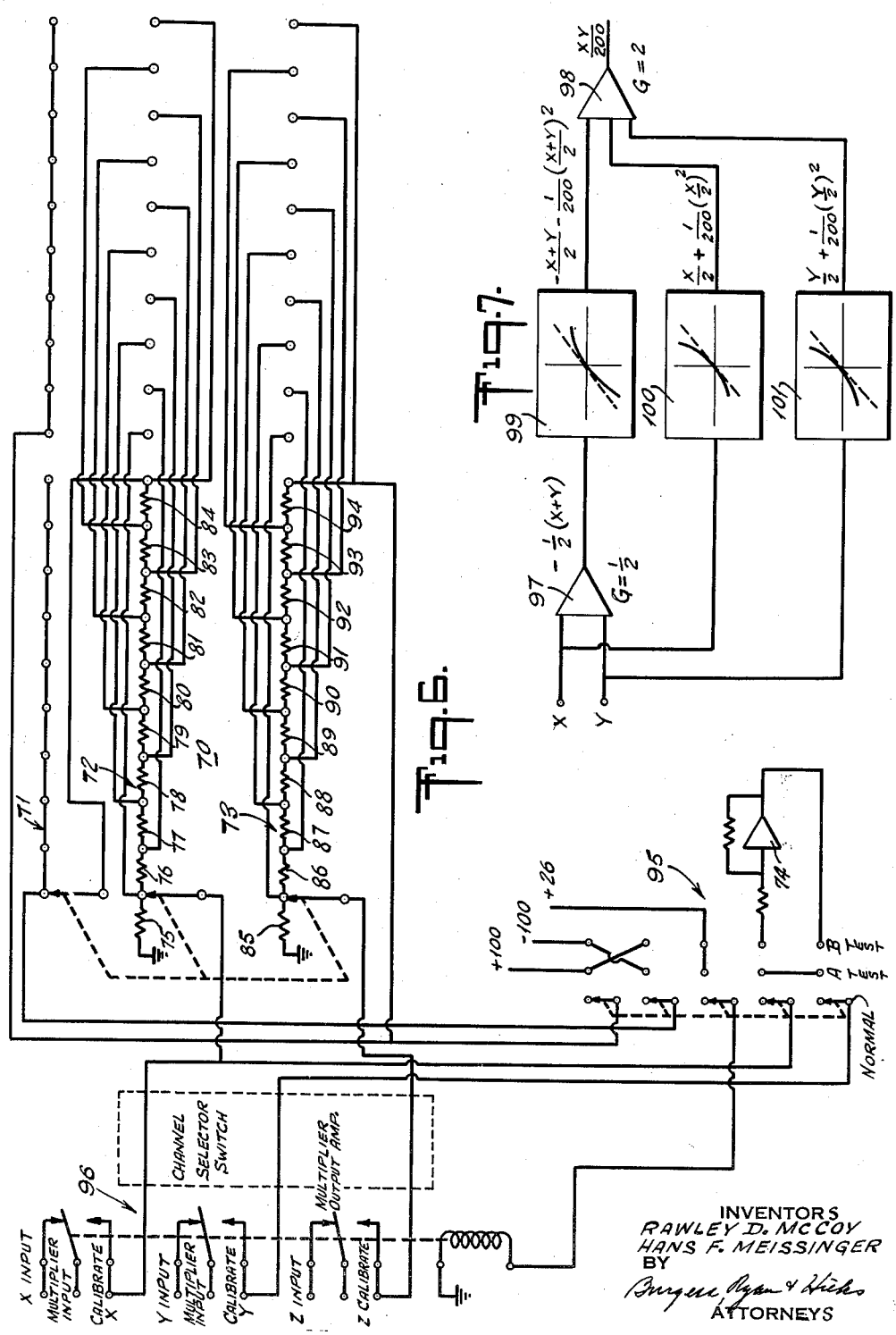

United States Patent Office 3,031,143
Patented Apr. 24, 1962

3,031,143
ELECTRONIC COMPUTING METHOD AND APPARATUS
Rawley D. McCoy, Bronxville, and Hans F. Meissinger, Forest Hills, N.Y., assignors to Reeves Instrument Corporation, New York, N.Y., a corporation of New York
Filed Jan. 7, 1955, Ser. No. 480,357
20 Claims. (Cl. 235—194)

This invention relates to electronic computing equipment and more specifically to a method and apparatus for generating voltages representing the solution of equations involving the product or quotient of two or more variable quantities as well as the squaring of individual quantities and the extraction of square roots and other similar operations.

One object of the invention resides in the provision of a high speed multiplying method and apparatus for generating a voltage related to the square of an input voltage. It is characterized by its simplicity, accuracy and dependability and embodies an arrangement of components that will produce a parabolic function of a given voltage. Another object of the invention resides in the provision of a computer for generating a voltage representing the product of two variable quantities and overcoming the need for complicated and expensive equipment heretofore required. This is attained through the provision of multiplying means for squaring the sum and difference of two quantities and then computing the difference between the squared values.

Two or more multipliers may be utilized in the computation of more complicated equations involving all four quadrants without any loss of accuracy even with relatively small input voltages. Through the improved arrangement of components in accordance with the invention the inherent accuracy of the device is primarily dependent upon the number of elements utilized to attain the parabolic function and the sensitivity of the unit as a whole to input voltages can be changed in accordance with such voltages so that maximum accuracy can be maintained at all times.

Still another object of the invention resides in an improved method and apparatus for determining the product of two variable quantities wherein means are included to facilitate calibration and readjustment for maximum accuracy.

Still another object of the invention is the provision of computing apparatus for producing a voltage related to the square of one quantity or the product of at least two quantities that avoids complicated and expensive equipment and that will function with high degrees of accuracy at frequencies of at least several kilocycles and even higher.

A still further object of the invention is the provision of inexpensive, accurate and highly dependable computing equipment that may be utilized not only for producing the square of a variable quantity, but also for extracting the square root, and for determining the quotient of two or more variables.

Still another object of the invention resides in the provision of an improved computing device and method of operation.

The above and other objects and advantages of the invention will become more apparent from the following description and drawings forming part of this application.

Figure 4:
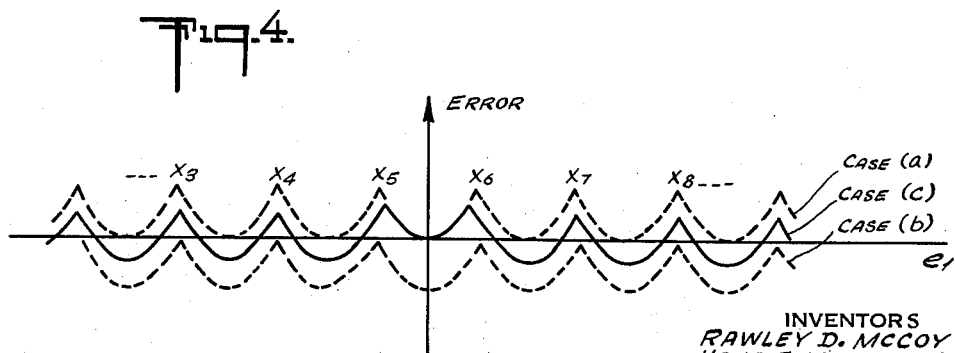

In the drawings:
FIG. 1 is a block diagram of computing apparatus in accordance with the invention;
FIG. 2 is a circuit diagram of one embodiment of computing networks forming part of the apparatus of FIG. 1;
FIGS. 3 and 4 are graphical representations of certain operating characteristics of the invention;
FIG. 5 is a block diagram of another embodiment of the invention;
FIG. 6 is a circuit diagram for one embodiment of a calibrating network forming part of the invention; and
FIG. 7 is a block diagram of still another embodiment of the invention.

Broadly, the invention involves an improved multiplying system for producing products and quotients of two or more variables, generating voltages related to the squares and square roots of variable quantities, performing direct division and other related operations. These ends are attained in part through an improved arrangement of components for generating a parabolic function of an input voltage and in part through the combination of these function generators with amplifiers and feedback systems to attain high speed, accurate computation with a minimum of equipment. In addition, a simplified, precise method of calibration may be employed to insure proper operation at all times.

Reference is now made to FIG. 1 of the drawings illustrating one embodiment of the invention for generating a voltage representing the product of two variables.
The circuit comprises three summing amplifiers 1 to 3, inclusive, of which amplifiers 1 and 2 are used to generate voltage $e_1$ and $e_2$ in order to form the expressions $$-\frac{1}{2}(x+y) \text{ and } -\frac{1}{2}(x-y)$$

respectively. For this purpose amplifier 1 has a gain of one-half while amplifier 2 has a gain of unity and their output voltages are fed to the squaring circuits 4 and 5. The output of these circuits are in turn fed to the amplifier 3, having a gain of two, which generates a voltage related to the difference of the square terms and thus yields the product of the input variables $x$ and $y$. In detail, the mathematical relations involved in this operation are the following:

Output voltage of summing amplifier 1

$$-e_1 = -\frac{x+y}{2}$$

Output voltage of summing amplifier 2

$$e_2 = -\frac{x-y}{2}$$

Contribution of circuit 4 to output voltage of summing amplifier 3

$$e_{3A} = -2\left[e_1 + \frac{1}{200}e_1^2\right] = 2\left[\frac{x+y}{2} - \frac{1}{200}\left(\frac{x+y}{2}\right)^2\right]$$

Contribution of circuit 5 to output voltage of summing amplifier 3

$$e_{3B} = -2\left[e_2 - \frac{1}{200}e_2^2\right] = 2\left[\frac{x-y}{2} + \frac{1}{200}\left(\frac{x-y}{2}\right)^2\right]$$

Total output voltage of summing amplifier 3

$$e_3 = e_{3A} + e_{3B} - 2x = -\frac{xy}{100}$$

The gain factors ½, 1, and 2 in amplifiers 1, 2, and 3, respectively, are chosen to give a convenient scale for the voltages appearing at the input of the networks and at the output of amplifier 3. With these scales the voltages $e_1$, $e_2$ and $e_3$ do not exceed 100 volts in magnitude if $x$ and $y$ are within the range of ±100 volts. This is desirable in order to remain within convenient design limits of the function shaping networks 4 and 5 that will be described in detail. Actually either factor $x$ or $y$ may exceed 100 volts in magnitude without overloading the circuit as long as $x+y$ and $x-y$ do not not exceed ±200 volts. Other combinations of scale factors than those described may of course be chosen for the circuit.

The multiplier circuit is designed to operate on the quadratic content of the voltages produced by the networks 4 and 5, and the linear content in $x$ and $y$ is cancelled out in the last stage. This is accomplished for the $x$ voltage by means of the additional linear input $x$ into amplifier 3. For the $y$ voltage an automatic cancellation of the linear contributions from networks 4 and 5 takes place, so that no additional input is necessary. To insure substantially complete cancellation of all terms but $xy$ in the output voltage $e_3$ it is important that the gain factors in networks 4 and 5 are the same and the parabolas generated thereby are symmetrical to each other with respect to the origin.

An important feature of this circuit is the use of only a single branch of a parabola in each channel, which has the advantage of operating on a curve that increases monotonically with increasing argument, $e_1$ or $e_2$. As is seen from the derivation of the output voltage, $$e_3 = -\frac{xy}{100}$$

the circuit permits a complete four-quadrant operation, with $x$ and $y$ allowed to assume positive or negative values arbitrarily. This important advantage is obtained because the extraction of the quadratic content of the parabolic curves referred to above in effect makes this multiplier equivalent to one utilizing both the positively and negatively inclined branches of two parabolas. If the two input voltages $x$ and $y$ are zero, the networks 4 and 5 yield no output voltages, so that the total output $e_3$ is exactly zero, provided the amplifiers, 1, 2, and 3 are satisfactorily zero-stabilized. Furthermore, for small voltages $x$ and $y$ the networks give a very accurate representation of the center section of the parabolas, as will be discussed in greater detail below, and therefore the total output voltage represents the product $xy$ with a high degree of relative accuracy. This feature, i.e. the exact performance at or near zero constitutes a considerable improvement in electronic multipliers as it overcomes unbalance at zero which is a major cause of inaccuracy requiring frequent readjustment of the circuitry.

Before discussing other properties of the multiplier and further modifications of the basic design the function shaping circuits 4 and 5 will now be described. FIGURE 2 shows a circuit diagram of one embodiment of these networks which comprises a number of diode channels connected in two separate groups. In the upper half of the diagram, there is illustrated a set of vacuum tube diodes 22, 23, . . . 26 whose plates are fed from a series of taps on a voltage divider having fixed resistances 10, 11, . . . 15, and whose cathodes are connected in series with fixed resistors 32, 33, . . . 36 and adjustable resistors 32a, 33a, . . . 36a, respectively. These resistors are connected to the summing junction 48 which feeds the input 48' of a summing amplifier 45 having the feedback resistor $R_3$. Also connected to the junction 48 is the resistor $R_2$ which is in series with resistor $R_1$ connected to the input terminal 50 through junction 46. If none of the diodes in the network are in the conducting state, voltage $e_{3A}$ appearing at the output terminal 49 of the summing amplifier is proportional to the input voltage $e_1$ applied at terminal 50, as given by the relation $$e_{3A} = -\left(\frac{R_3}{R_1+R_2}e_1\right)$$

in which the ratio $R_3/(R_1+R_2)$ of the feedback and input resistors determines the gain of the amplifier for zero input voltage. In the arrangement shown, a fixed negative bias of $-100$ volts is applied to the terminal 51 of the voltage divider so that the potential at the plates of diodes 22, 23, . . . 26 is negative for zero input voltage $e_1$ and therefore none of the diode channels conduct any current. In the non-conductive state, the cathodes of diodes 22, 23, . . . 26 are approximately at ground potential inasmuch as they are connected through series resistors to the summing junction 48. As $e_1$ is increased to positive values the plate potential of each diode becomes positive in successive order, and in consequence, additional currents proportional to the increase in $e_1$ flow into the summing junction through resistors 32, 33 through 36, thereby increasing the effective gain of the summing amplifier in successive steps, as indicated by the increasing slope in the output curve 42 of the network, shown in FIGURE 3.

Conversely, the diode channels shown in the lower half of FIGURE 2 have the function of decreasing the effective gain of the amplifier in successive steps. This part of the network consists of a voltage divider comprising fixed resistors 16, 17, . . . 21, which is grounded on one end and fed by a fixed negative voltage of $-100$ volts at the terminal 52, as shown. In an arrangement similar to the circuit described above, the taps on the voltage divider feed the plates of diodes 27, 28, . . . 31 which are in series with fixed resistors 37, 38, . . . 41 and adjustable resistors 37a, 38a, . . . 41a, respectively. The resistors are connected to the junction 47 of resistors $R_1$ and $R_2$. For zero input voltage $e_1$ the diodes 27, 28, etc. do not conduct any current on account of the negative bias of their plates. As $e_1$ assumes negative values these diodes begin to conduct in successive order, starting with diode 27, thereby increasing the current flowing in resistor $R_1$ in the direction from junction 47 to 46. Hence the potential at junction 47 is less negative than would appear there in the absence of the diode network. In consequence, the output curve 42 shown in FIGURE 3 assumes successively smaller slopes as the input voltage $e_1$ becomes more negative. The stepwise variation in slope as a function of input voltage is shown graphically at the bottom of FIGURE 3 and denoted by the numeral 43.

The network described above acts as a variable impedance. The upper half having the diodes connected as series input limiters represents a decreasing series impedance for increasing positive input voltages. The lower half having diodes connected as shunt-load limiters represents a decreasing shunt impedance for increasingly negative input voltages.

The functional character of the voltage $e_{3A}$ generated by this shaping network depends on the choice of the resistors 10 through 21 in the voltage dividers, the series resistors 32, 33, . . . 41, and on the resistors $R_1$, $R_2$, and $R_3$ which determine the slope of the center segment of the output curve. The resistances in the voltage dividers determine the bias voltages of the individual diodes and hence the breakpoints $B_1$, $B_2$, $B_3$, etc. of the line segments of the output curve 42, while the series resistors together with $R_1$, $R_2$, and $R_3$ determine the slopes $m_0$, $m_1$, $m_2$, . . . $m_{10}$.

In the multiplier in accordance with the invention, the network functions as a square-law shaping device with the objective of accurately approximating a parabola. Although a total number of 10 diodes was chosen in the specific example described, a free choice of fewer or more elements in the network can be made depending on the accuracy requirements, as will be discussed below. In order to approximate a parabola over a given range of abscissa values most accurately by a segmented curve having a given number of segments, the length of the abscissa increments per segment should preferably be made equal. In this case an error curve will consist of a sequence of identical parabolic arcs joined together at the breakpoints $x_1$, $x_2$, $x_2$, . . . $x_n$ corresponding to the points $B_1$, $B_2$, $B_3$ . . . $B_n$ of the segmented curve, as shown in FIGURE 4 on an enlarged scale. Obviously, if one segment were made longer than the others, the maximum deviation of the corresponding parabolic error would be larger than the maximum deviation anywhere else along the error curve. In FIGURE 4, three types of error curves are illustrated: the error existing (a) if all line segments are tangential to the desired parabola, (b) if the line segments are secants inscribed into the parabola, (c) if the line segments are secants, intersecting the parabola in a manner which equalizes the maxima of positive and negative deviation. Case c is the one of optimum accuracy obtainable with a given number of segments, the error being distributed with respect to zero error. To be precise, the error curve c can not be exactly realized at zero input voltage because here the line segment must be tangential to the desired parabola, unless the network illustrated in FIGURE 2 is slightly modified as will be explained hereinafter. However, by making the central segment between breakpoints $B_5$ and $B_6$ somewhat shorter than the adjacent segments it is possible to reduce the maximum deviation which occurs at these breakpoints.

It is also noted that the corners at which the line segments of FIGURE 3, and correspondingly the parabolic arcs of FIGURE 4, are joined together are in reality rounded off due to a gradual transition from the non-conducting to the conducting state, and vice versa, which takes place in the diodes. Similarly the staircase polygon 43 representing slope as a function of the input voltage (see FIGURE 3) actually is rounded at the corners. This effect is of advantage inasmuch as it tends to reduce the maximum deviations of the error function, and gives a smoother performance of the multiplier.

The resistances 10 through 21 are chosen so as to produce breakpoints at equal intervals and the resistances 32 to 41 are chosen to yield equal steps in slope in accordance with the fact that in a parabola the slope changes uniformly as function of the argument. In order to permit an adjustment of the shape of the output function to minimize errors due to fluctuation in the resistance values, and to compensate for fluctuation in contact potential in the vacuum tube diodes and for difference in tube characteristics in case of replacement, the variable resistors $32a$ to $41a$ in series with the diodes have been included in the circuit. Adjustment of these resistances changes the slopes of the output curve, or, in the case of the shunt-load circuit, the slopes and the breakpoints. In order to adjust the circuit for optimum accuracy, it should be accomplished from the origin outward, by varying the slope resistors in the sequence $37a, 38a, \ldots 41a$, for the shunt-load section, and similarly in the sequence $32a, 33a, \ldots 36a$, for the series diode section until all segments match the desired parabola within the desired accuracy. A provision for rapid adjustment of the function shaping circuits by means of a sequence of calibrated input voltages will be described below after the complete network for the multiplier has been presented.

It may be seen from the above that other methods for adjusting the network to minimize functional errors may be employed. For example, instead of varying the series resistances in the diode channels the tap locations on the voltage dividers could be varied, which has the effect of shifting individual breakpoint locations in the shunt-load as well as in the series diode network. By adding a variable end resistor to resistors 15 and 21 the location of all breakpoints may be changed proportionally to make the total output curve appear flatter or steeper without changing the individual slope resistors.

With the circuit described above the maximum error of a parabolic generator having 10 diode channels, or 11 linear segments, in the range of $-100$ to $+100$ volts, for which the output voltage satisfying the relationship $$e_{3A} = -2\left(e_1 + \frac{1}{200}e_1^2\right)$$

ranges from $+100$ to $-300$ volts, respectively, will not exceed $\pm.5$ volt. In this case the length of the linear segment corresponds to 20 volts in $e_1$. The total error of the multiplier obtained by adding the absolute values of the error of each shaping circuit amounts to $\pm 1.0$ volt. To obtain improved accuracy it is necessary to increase the number of line segments used. It will be observed that the error is inversely proportional to the square of the number of segments per parabola. Thus, a multiplier having 20 diodes in each squaring circuit has a maximum error of $\pm.25$ volt. Actual measurements on a unit of this type have shown that maximum errors of the product $$\frac{xy}{100}$$

are well within $\pm.25$ volt.

A complete circuit diagram of the electronic multiplier is illustrated in FIGURE 5. The diagram shows three summing amplifiers 60, 61, and 62 and the diode networks 4' and 5' each including 10 twin vacuum tube diodes or a total of 20 diodes. Except for the number of diodes and certain additional features to be described below, networks 4' and 5' are identical with the networks 4 and 5 of FIGURE 2. The input resistor previously consisting of two sections $R_1$ and $R_2$ is now divided into four sections $R_{11}$, $R_{12}$, $R_{13}$ and $R_2$ connected at junctions 47'', 47', and 47, respectively. An additional shunt load channel consisting of a crystal diode 63 and a resistor 64 is connected from junction 47'' to ground for the purpose of providing an additional breakpoint at $e_1=0$. The two line segments adjacent to this breakpoint correspond to an interval length of 5 volts each and give an improved approximation to the parabola for small input voltages. The remaining segments correspond to an interval length of 10 volts having breakpoints at $\pm 5, \pm 15, \pm 25, \ldots \pm 95$ volts.

Another feature of this network is the connection of a small capacitor 44 between junctions 47'' and 47 shunting the series resistors $R_{12}$ and $R_{13}$. This arrangement provides a compensation for the combined stray capacitance to ground which is present in the various elements of the shunt-load circuit, and hence serves to diminish the phase lag in the network which becomes noticeable when operating the circuit at high frequencies.

Still another modification embodied in the circuit of FIGURE 5 is the inclusion of shunt diode 65. This diode reaches the conductive state after all other diodes in the shunt load circuit, i.e. when the input $e_1$ equals $-95$ volts. Since the slope required for the last segment of the curve is very small, no external resistor is used in this channel, the plate resistance of the diode yielding a small slope. Since the slope of this segment cannot be controlled, an adjustment of the breakpoint, which in this embodiment of the invention should occur at $-95$ volts, is provided by means of a separate voltage divider consisting of two fixed resistors 66 and 67 and a potentiometer 68. This voltage divider is connected between the $-100$ volt terminal 52 and ground. The plate of diode 65 is connected to the potentiometer arm, and the cathode to junction 47' of resistors $R_{13}$ and $R_{12}$.

The difficulty arising from the lack of control over the slope of the above mentioned linear segment can also be overcome in the following manner: Instead of generating a parabola having unity slope at $e_1=0$ and zero slope at $e_1=-100$ volts, the slope of the linear content (at $e_1=0$) is increased by a small amount, e.g. to 1.1, so that the minimum slope required at $e_1=-100$ volts becomes 0.1 instead of zero. Since this slope can be controlled in the same manner as the slope of the remainder of the segments a separate circuit is no longer needed.

Network 5' shown in FIGURE 5 is arranged in complete symmetry with network 4' and the same numerals have been used to designate like components. It is designed however to produce an output curve having a quadratic content opposite in sign to that generated by network 4'. To this end, the series and shunt-load diodes are connected to their respective voltage dividers in reverse direction, and the bias applied to these voltage dividers at terminals 51' and 52' is +100 instead of −100 volts.

The output terminals 48 of networks 4' and 5' are connected to the summing junction 48' of amplifier 62. A third input is the voltage $x$ which is required to cancel the linear content of the parabolas generated by networks 4' and 5'. A further input voltage $z$ is added to make the total output of amplifier 62 equal to $$-\left(\frac{xy}{100}+z\right)$$

This $z$ input is used in the calibration procedure described in the next paragraph. The multiplier circuit also contains an arrangement to change the sign of the output product simply by interchanging the input voltages $e_1$ and $e_2$ fed to networks 4' and 5'. If the switch $S_1$, normally held in position 1 to yield $$-\frac{xy}{100}$$

is turned to position 2, the contributions of network 4' and 5' to the output voltage $e_3$ become:

$$e_{3A}=2\left[\frac{x-y}{2}-\frac{1}{200}\left(\frac{x-y}{2}\right)^2\right]$$

and $$e_{3B}=2\left[\frac{x+y}{2}+\frac{1}{200}\left(\frac{x+y}{2}\right)^2\right]$$

In this case the total output of amplifier 62 becomes $$+\frac{xy}{100}$$

The input voltage $z$ in this case is assumed to be zero.

The calibration circuit is shown in FIGURE 6. It comprises a rotary stepping switch 70 having three banks of contacts 71 to 73 and not less than 20 positions, an inverting amplifier 74 and voltage dividers consisting of resistors 75 to 84 connected in switch bank 72 and resistors 85 to 94 connected in switched bank 73. These resistors serve as sources of calibration voltages connected to the various contacts of the switch. In addition, a 5-pole three-position switch 95 and a 3-pole double-throw relay 96 are used for the operation of the circuit. The calibration proceeds in the following manner: With the operate-test switch 95 in "A-test" position, voltages $x$ and $y$ of equal magnitude are inserted into the multiplier starting at −10 volts, and continuing in successive steps of −10 volts by operating step switch 70. This test only affects network 4' while network 5' has zero input under the condition $x=y$. The products $$-\frac{x^2}{100}$$

obtained at the last stage are matched against calibration voltages $z$ which change by appropriate steps as the range from −10 to −100 volts is scanned. At each step the departure of the output voltage from the calibration voltage is observed on amplifier 62 and reduced to zero by adjusting the proper slope resistor in the diode network under test. For convenience of operation a bank of pilot lights may be employed and operated in synchronism with the stepping switch 70 to indicate the diode channel to be adjusted at each position of the stepping switch. The next 10 positions of the stepping switch scan the opposite branch of the curve generated by network 4' starting from 10 volts and increasing $x$ by steps of 10 volts. With network 4' completely calibrated, the operate-test switch 95 is thrown to "B-test" position. In this condition, voltages $x$ and $y=-x$ are inserted into the multiplier so that only network 5' is tested. Again, the entire range of the output values is scanned in successive steps, first going from 10 to 100 volts and next from −10 to −100 volts. The contacts of each bank of the stepping switch 70 are so interconnected that one voltage divider yielding input voltages and one voltage divider yielding output calibration voltages are sufficient for the entire calibration. After completion of the test and adjustment procedure which usually requires only a few minutes of work, the operate-test switch 95 is thrown back into "operate" which causes the relay 96 to disconnect the stepping switch output voltages from the $x$, $y$, and $z$ input terminals of the multiplier so that the unit is ready to function.

While the embodiment of the invention illustrated in FIGS. 1 through 6, inclusive, is particularly useful for generating voltages related to the product of two quantities, it may also be employed with some modification to perform other computations. Referring to FIG. 5, for instance, a switching arrangement may be employed to disconnect the output terminals 48 of the diode networks 4' and 5' from the amplifier 62 and couple them directly to separate amplifiers, each of which are similar to amplifier 62. This makes the networks or channels with the associated amplifier independent of each other. By providing an auxiliary input voltage to each amplifier for the purpose of subtracting the linear content of the parabola generated by such networks, output voltages related to the squares of said quantities will be obtained. This procedure will also enable the development of an output voltage varying as the square root of a given variable voltage by utilizing the principle of inverse feedback.

Still another application of the electronic multiplier shown in FIG. 5 involves the computation of a quotient $$\frac{x}{y}$$

of two variables $x$ and $y$. This is an indirect method of division which can be accomplished with the equipment in accordance with the invention and with high degrees of accuracy. For the attainment of this end the output voltage of the multiplier is connected to a high gain amplifier to which is also fed a voltage representing the variable $x$. The output of the amplifier is then connected to one of the inputs of the multiplier, while the other input terminal is connected to a voltage representing the variable $y$. With this arrangement the high gain amplifier establishes the relation $x-yw=0$, $w$ being the amplifier output. Hence the division $w=x/y$ is accomplished.

Another aspect of this multiplier resides in the attainment of direct division. Considering the embodiment of the invention in FIG. 5, for example by applying a negative variable voltage proportional to the quantity $w$ to the terminals 51 and 52 of the network 4' and a positive voltage proportional to the variable $w$ to the terminals 51' and 52' of the network 5', the output of the multiplier will be $$u=xy/w$$

Thus direct division through $w$ is feasible at least within a certain range of that variable.

A further modification of the invention is illustrated in FIG. 7 of the drawings and utilizes two amplifiers 97 and 98 and three networks 99, 100 and 101. The network 99 corresponds to the network 5' of FIG. 5, whereas the networks 100 and 101 are similar to the network 4' of FIG. 5. The slope of the linear portion of the transfer characteristic of networks 100 and 101 is equal to one-half the slope of the linear portion of network 4'. With this arrangement which produces the product of $x$ and $y$, voltages representing these variables are fed to the amplifier 97 which has a gain of one half. The output of the amplifier is fed to the network 99. The voltage $x$ is also fed to the network 100, while the $y$ voltage is fed to the network 101. The outputs of the three networks are then fed to the output amplifier 98 having a gain of two and the combination of these three signals produces an output voltage varying in accordance with the product of the two varables. The relation involved in this computation is $$xy=\tfrac{1}{2}[(x+y)^2-x^2-y^2]$$

In addition, this method can be extended to the case where a plurality of products $xy$, $xz$, and $xw$, and the squares $x^2$, $y^2$ and $w^2$ are desired.

While in the illustrated embodiments of the invention the diode networks 4, 5, 4', 5' and 99 through 101 utilize vacuum tubes, it is apparent that any suitable type of rectifier or other equivalent elements may be employed. Similarly, other modifications, changes and alterations may be made without departing from the true scope and spirit of the invention.

We claim:

1. A parabolic function generator comprising a voltage divider having a plurality of taps thereon and a pair of end terminals, an input terminal connected to one end terminal, an output terminal, a pair of series connected impedances connecting said input and output terminals, a diode including a series resistor connected between each voltage divider tap and said output terminal, a second voltage divider having a pair of end terminals and a plurality of taps thereon, a diode including a series resistor connected between each tap on said second voltage divider and the junction of said series connected resistors, and means for applying a ground to one end terminal of said second voltage divider and potentials to the other terminals of both dividers.

2. The parabolic function generator as defined by claim 1 further comprising an amplifier having an input coupled to said output terminal, and a feedback resistor coupled between the output of said amplifier and said output terminal.

3. A computer comprising an input amplifier responsive to a pair of input voltages to produce a voltage related to the sum of said input voltages, a first parabolic function generator connected with said amplifier, said first parabolic function generator having a first parabolic transfer characteristic, a second parabolic function generator connected with one of said input voltages, a third parabolic function generator connected with the other of said input voltages, said second and third parabolic function generators having a second parabolic transfer characteristic different from said first parabolic transfer characteristic, and an output amplifier connected with said function generators to produce an output signal related to the product of said input voltages.

4. A non-linear translating device having a parabolic transfer characteristic for producing an output voltage whose magnitude varies according to the sum of an applied input voltage and the square of the applied input voltage, comprising in combination, an input terminal, an output terminal, a common terminal, first and second resistors coupled in series between said input and output terminals, first unilateral conductive means coupled between said input and output terminals, and second unilateral conductive means coupled between the junction of said first and second series coupled resistors and said common terminal.

5. The non-linear translating device as defined in claim 4 wherein said first unilateral conductive means includes a first voltage divider having first and second end terminals and a plurality of taps thereon, one of said end terminals being coupled to said input terminal and the other end terminal being adapted for receiving a fixed direct voltage, and a diode and resistor coupled in series between each tap on said first voltage divider and said output terminal; and wherein said second unilateral conductive means includes a second voltage divider having first and second end terminals and a plurality of taps thereon, one of said end terminals being coupled to said common terminal, and the other end terminal being adapted for receiving a fixed direct voltage, and a diode and resistor coupled in series between each tap on said second voltage divider and the junction of said first and second resistors.

6. The non-linear translating device as defined by claim 4 wherein said first unilateral conductive means possesses a decreasing impedance for increasing positive input voltages, and wherein said second unilateral conductive means possesses a decreasing impedance for increasing negative input voltages.

7. A computer circuit for producing an output voltage whose magnitude varies according to the square of an applied direct input voltage comprising in combination, a directly-coupled non-linear translating device having an input terminal, an output terminal, and a common terminal, said translating device having a parabolic transfer characteristic for producing an output voltage whose magnitude varies according to the sum of the applied direct input voltage and the square of the applied direct input voltage, said translating device including series and shunt non-linear impedance means coupled to said terminals, and means coupled to said input terminal and said output terminal for subtracting the applied input voltage from the output voltage of said non-linear network.

8. In a computer circuit, a function generator for producing an output voltage varying in magnitude and polarity according to the square of an applied voltage comprising in combination, a non-linear translating device having an input terminal, an output terminal, and a common terminal, first and second resistors coupled in series between said input and output terminals, a first non-linear conductive means coupled between said input terminal and said output terminal, a second non-linear conductive means coupled between the junction of said first and second resistors and said common terminal, said non-linear translating device possessing a parabolic transfer characteristic for producing an output voltage whose magnitude varies according to the sum of the applied input voltage and the square of the applied input voltage, and means coupled to said input terminal and said output terminal for producing an output voltage relative to said common terminal varying according to the difference between said applied voltage and the output voltage from said non-linear translating device.

9. An analog multiplier for multiplying a first applied voltage by a second applied voltage comprising in combination, first combining means responsive to said first and second applied voltages for producing a first output voltage varying according to the sum of said first and second applied voltages, second combining means responsive to said first and second applied voltages for producing a second output voltage varying according to the difference between said first and second applied voltages, a first non-linear translating device coupled to the output of said first combining means for receiving said first output voltage, a second non-linear translating device coupled to the output of said second combining means for receiving said second output voltage, each of said first and second non-linear translating devices includes an input terminal, an output terminal, and a common terminal; each of said non-linear translating devices further including first and second series-coupled resistors coupled between the input and output terminals, first unilateral conductive means coupled between the input and output terminals and second unilateral conductive means coupled between the junction of said series-coupled resistors and said common terminal; said first and second non-linear translating devices possessing different parabolic transfer characteristics, third combining means coupled to the outputs of said first and second non-linear translating devices, and means coupling one of said first or second applied voltages to said third combining means, said third combining means producing an output voltage varying according to the product of said first and second applied voltages.

10. In an electronic multiplier circuit for producing an output voltage varying according to the product of first and second applied voltages, the combination comprising a first non-linear translating means, a second non-linear translating means, each of said first and second non-linear translating means including an input termial, an output terminal, and a common terminal; each of said translating devices further including first and second resistors coupled in series between the input and output terminals, first unilateral conductive means coupled between the input and output terminals, and second unilateral conductive means coupled between the junction of said series-coupled resistors and said common terminal; said first and second non-linear translating means possessing different transfer characteristics, one of said non-linear means possessing a parabolic transfer characteristic having a progressively increasing slope for increasing positive voltages and a progressively decreasing slope for increasing negative voltages, the other non-linear translating means possessing a parabolic transfer characteristic having a progressively decreasing slope for increasing positive voltages and a progressively increasing slope for increasing negative voltages, means coupling said first and second applied voltages to said first non-linear translating means, means coupling said first and second applied voltages to said second non-linear translating means, and combining means coupled to the outputs of said first and second non-linear translating means.

11. In an electronic multiplier circuit for producing an output voltage varying according to the product of first and second applied voltages, the combination comprising a first non-linear translating means, a second non-linear translating means, each of said first and second non-linear translating means including a series non-linear impedance element and a shunt non-linear impedance element, said first non-linear translating means possessing a different transfer characteristic than said second non-linear translating means, said first non-linear translating means having a progressively decreasing series impedance for increasing positive voltages and having a progressively decreasing shunt impedance for increasing negative voltages, said second non-linear translating means having a progressively decreasing series impedance for increasing negative voltages and having a progressively decreasing shunt impedance for increasing positive voltages, means coupling said first and second applied voltages to said first non-linear translating means, means coupling said first and second applied voltages to said second non-linear translating means, and combining means coupled to the outputs of said first and second non-linear translating means.

12. The apparatus as defined in claim 11 wherein said means coupling said first and second applied voltages to said first non-linear translating means couples the sum of said first and second applied voltages, and wherein said means coupling said first and second applied voltages to said second non-linear translating means includes means coupling the difference between said first and second applied voltages to said second non-linear translating means.

13. The apparatus as defined in claim 11 further comprising means coupling one of said first or second applied voltages to said combining means.

14. In an electronic multiplier circuit for producing an output voltage varying according to the product of first and second applied voltages, the combination comprising first and second non-linear translating means, each of said first and second non-linear translating means including a plurality of series non-linear impedance elements and a plurality of shunt non-linear impedance elements each of said first and second non-linear translating means having a transfer characteristic producing an output voltage varying in magnitude and polarity according to the algebraic sum of an input voltage and the square of said input voltage, first combining means coupled to said first and second applied voltages for coupling the algebraic sum of said first and second applied voltages to said first non-linear translating means, second combining means coupled to said second non-linear translating means, said second combining means being responsive to said first and second applied voltages for coupling the alegbraic difference between said first and second applied voltages to said second non-linear translating means, and third combining means coupled to the outputs of said first and second non-linear translating means.

15. The apparatus as defined in claim 14 wherein said first combining means includes a first summing amplifier having first and second input terminals for receiving said first and second applied voltages, and wherein said second combining means includes a second summing amplifier having one of its input terminals coupled to the output of said first summing amplifier and its other input terminal receiving one of said applied voltages.

16. A circuit arrangement for producing an output voltage varying in magnitude according to the square of an applied voltage comprising in combination; phase inverting amplifier means; a non-linear translating device having an input terminal coupled to the output of said amplifier means, said non-linear translating device having an output terminal and a common terminal and producing an output voltage whose magnitude varies according to the sum of the input voltage coupled to its input terminal and the square of this input voltage; said non-linear translating device further including first and second resistors coupled in series between said input and output terminals, first unilateral conductive means coupled between said input and output terminals, and second unilateral conductive means coupled between the junction of said first and second series-coupled resistors and said common terminal; and combining means coupled to said output terminal and to the input of said amplifier means for combining the applied voltage and the output voltage from said non-linear translating device to produce an output voltage varying according to the square of the applied voltage.

17. In an electronic analog multiplier circuit, the combination comprising first and second non-linear translating devices, each of said first and second non-linear translating devices possessing a parabolic transfer characteristic, each of said non-linear translating devices including series non-linear impedance elements and shunt non-linear impedance elements, one of said non-linear translating devices producing an output voltage varying in magnitude and polarity according to the algebraic sum of an applied input voltage and the square of said applied input voltage, the other of said non-linear translating devices producing an output voltage varying in magnitude and polarity according to the algebraic difference of a second applied input voltage and the square of said second applied input voltage, and combining means coupled to the output of said first and second non-linear translating devices, said combining means producing an output voltage varying according to the algebraic sum of the output voltages from said first and second non-linear translating devices.

18. Apparatus for producing an output voltage having a magnitude varying according to the square of an applied voltage comprising in combination, inverting means having an input and an output circuit, said inverting means being responsive to said applied voltage and inverting the polarity thereof, directly-coupled non-linear translating means coupled to the output of said inverting means, said non-linear translating means including series and shunt non-linear impedance means and producing an output voltage having a magnitude varying according to the difference between the square of said inverted voltage and said inverted voltage, and combining means coupled to the output of said non-linear translating means and to the input of said inverting means.

19. Apparatus for producing an output voltage having a magnitude varying according to a desired predetermined power of an applied voltage comprising in combination, inverting means having an input and an output circuit, said inverting means being responsive to said applied voltage and inverting the polarity thereof, directly-coupled non-linear translating means coupled to the output of said inverting means, said non-linear translating means including series and shunt non-linear impedance means and producing an output voltage having a magnitude varying according to the difference between the desired predetermined power of said inverted voltage and said inverted voltage, and combining means coupled to the output of soid non-linear translating means and to the input of said inverting means.

20. An analog multiplier system for multiplying first and second applied voltages comprising in combination, a plurality of non-linear translating devices, each of said non-linear translating devices including series and shunt non-linear impedance means, means coupling the sum of said first and second applied voltages to the input of one of said non-linear translating devices, said one non-linear translating device possessing a different transfer characteristic from the other of said non-linear translating devices and producing an output voltage varying according to the sum of said first and second applied voltages and the square of the sum of said first and second applied voltages, combining means having an input coupled to the output of said one non-linear translating device, and means responsive to said first and second applied voltages coupled to the input of said combining means, said responsive means including the other of said plurality of non-linear translating devices, said combining means producing an output voltage varying according to the product of said first and second applied voltages.

References Cited in the file of this patent

UNITED STATES PATENTS

| | | |
|---|---|---|
| 2,401,447 | Wipff | June 4, 1946 |
| 2,674,409 | Lakatos | Apr. 6, 1954 |

OTHER REFERENCES

Electronic Analog Computers (Korn and Korn), published by McGraw-Hill Book Co., New York, 1952, page 214 relied on.

A Simple Electronic Multiplier (Norsworthy), Electronic Engineering (London), No. 26, pp. 72–75, February 1954.

Survey of Analog Multiplication Schemes (Edwards), Journal of Association for Computing Machinery, vol. 1, No. 1, pp. 27–35, January 1954.

A Quarter-Square Multiplier Using a Segmented Parabolic Characteristic (Chance, Williams, Yang, Busser and Higgins).

The Review of Scientific Instruments, vol. 22, No. 9, pp. 683–688, September 1951.

An Analog Multiplier Using Thyrite (Kovach and Comley), I.R.E. Transactions-Electronic Computers, vol. EC3, No. 2, pp. 42–45, June 1954.